3,097,948
PROCESS OF MILLING WHEAT WITH THE AID OF CHLORENE DIOXIDE

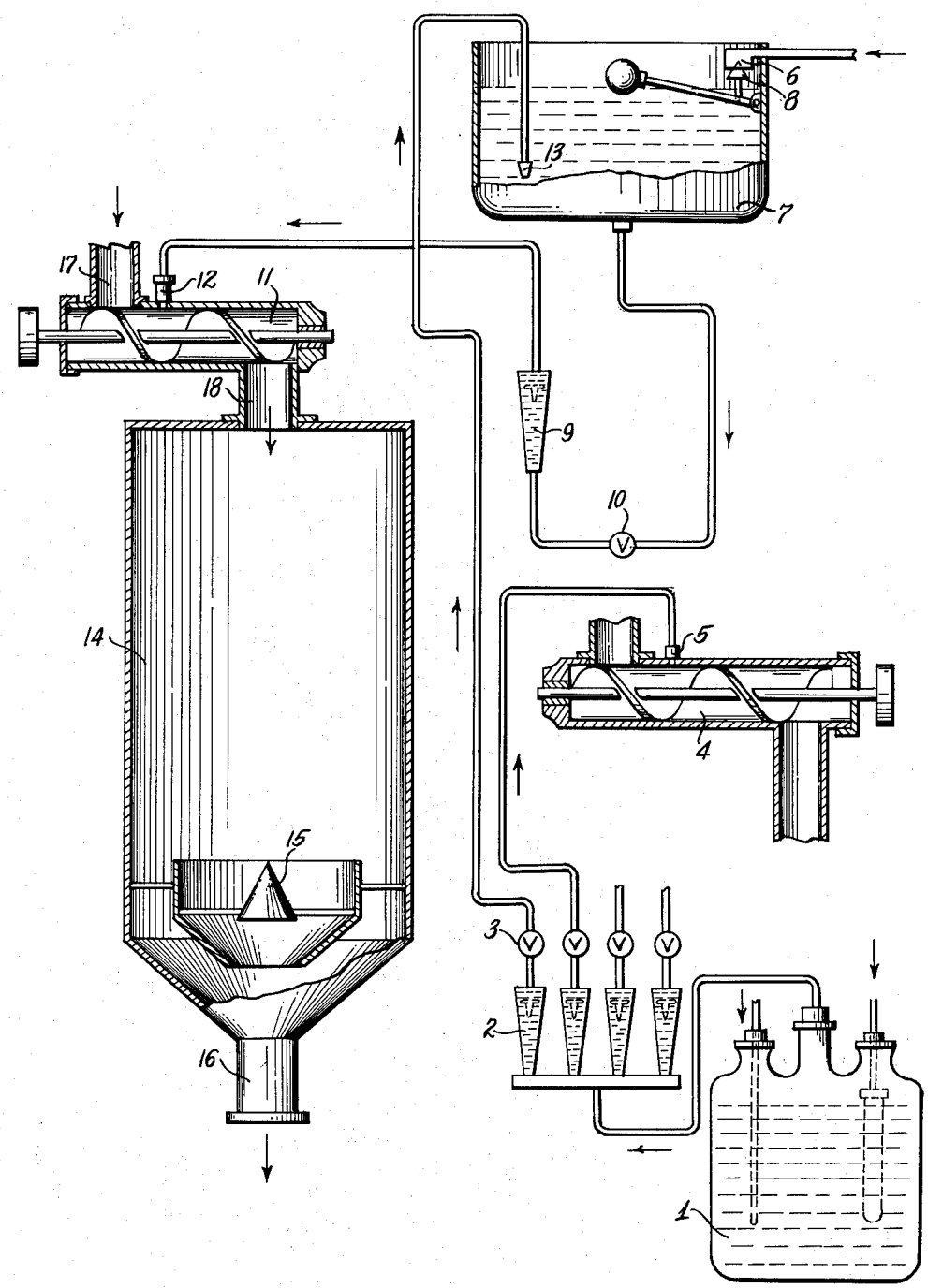

Kyuichi Ishikawa, 440 3-chome Sinmachi, Setagayaku, Tokyo City, Japan
Filed May 31, 1961, Ser. No. 113,858
4 Claims. (Cl. 99—80)

This invention relates to a flour milling process, is characterized by the fact that the wheat is treated with water and chlorine dioxide or an aqueous solution of chlorine dioxide and the wheat which has absorbed water and chlorine dioxide is then immediately ground.

The quality of flour is judged by the relative content of ashes. If the water content of two flours is equal, the flour with less ashes is considered to be of better quality.

Therefore, the problem of how to obtain a bran with a maximum ash content and a high-purity flour with a minimum ash content is a vital one in the milling technique of separating the skin from the endosperm of wheat grain, i.e., separating flour from bran.

The present invention, as stated above, concerns a process of separating the raw wheat into flour with a minimum ash content and bran with a maximum ash content by utilizing chlorine dioxide or an aqueous solution of chlorine dioxide in the milling process.

Usually, the flour milling process consists of selecting wheat grains; tempering (in which water is added to wheat grains to soften them and they are soaked in a tank with the water flow stopped until the added water satisfactorily penetrates the core of grain); transferring the wheat thus tempered to a subsequent stage at which a setting roll is primarily used and at which 1% water is added to the wheat (hereinafter this will be called "supplemental water addition") and the wheat is kept at room temperature for about 15 minutes, followed by grinding and further treatment. By this conventional process, a flour with a low water content may be obtained, but the separation of flour from bran is not always satisfactory. While with liberal addition of water, separation between these two may be improved, this entails the drawback that if the wheat is milled before it is fully penetrated with water, the milled substance will stick to the roll. If to avoid this drawback, the holding time for supplemental water addition is extended, part of the penetrating water will seep through the skin into the endosperm, causing an excess of water content in the flour.

The present inventor has, as described in detail in the following, probed into the distribution of ashes in wheat grains and the action of chlorine dioxide on wheat grains, bran and flour; and discovered, as stated above, that the use of chlorine dioxide and water or an aqueous solution of chlorine dioxide in the milling process highly facilitates separation of flour from bran and produces a high yield of a high-purity flour with least water, and an additional advantage in that the flour thus acquired can be kept in bacteriologically immaculate condition without any particular sterilization.

Essentially the milling process is an operation of separating flour from bran. Therefore the key to production of a high-purity flour lies in making the bran big, soft and elastic like rubber and preventing it from being fragmented into small pieces or fine powder.

If in the above-mentioned stage of supplemental water addition, water is treated with chloride dioxide or an aqueous solution of chloride dioxide, it will be possible to add the water to an increased amount of 2 or 3% instead of 1% or under; besides, the holding time of flour during the supplemental water addition may be cut down from the conventional 15 minutes to between one and two minutes. This implies that the milling is finished before the water progresses from the skin into the endosperm, making it easier to separate flour from bran.

Meanwhile, the increase of water to 2-3% during the supplemental water addition and the execution of milling work within one to two minutes after the water addition are tantamount to permitting the added water to stay within the skin of the wheat grain, as a result of which the skin of the wheat grain acquires a 10-15% richer water content than the endosperm. Consequently, the skin becomes so much softened with abundant water that the chlorine dioxide, which has been added together with water, can now penetrate into the texture of the skin together with water. This chlorine dioxide acts on, and slightly denatures the albumin. As a result, the latter is moderately coagulated, turning the entire skin into a rubber-like elastic mass with high toughness. This transformation proves very useful in preventing the bran from being pulverized by grinding and thereby retaining it in an enlarged mass.

It is well-known that the flour, when bleached with chlorine dioxide, changes from a sticky to a dry, crisp condition. If in the milling of flour a chlorine dioxide treatment is applied, a similar phenomenon to the above will occur in the ground materials, i.e., flour and bran; and the fluidity of these materials will be enhanced. Together with the above-mentioned phenomena of softening, toughening and enlarging of the wheat skin, this phenomenon will greatly contribute to separation of flour from bran.

If in the traditional method, supplemental water addition is increased from 1% to 2-3%, the ground materials will become so sticky as to be liable to cling to the flow path. By contrast, if the present invention is applied, an increase of supplemental water addition to 2-3% will bring these materials into a dry condition as stated above, owing to the action of chlorine dioxide. Whereas the traditional hot conditioning helps separation of bran by softening the endosperm of wheat grain, the chlorine dioxide treatment as proposed by the present invention works first to soften the skin, that is, the bran to be separated from the endosperm. This is more effective for separation of flour from bran than the conventional method and very helpful for prevention of the mixture of bran into flour.

When the present invention is adopted in the milling process, the roll effect, even if it is intentionally increased for better separation of special starch cells of endosperm from bran, will never injure the bran, which has been transformed into a rubber-like, elastic substance; thus any mixing of the ashy aleurone into the flour can be successfully prevented. Moreover, since the seed vessel, the seed coat and the hyaline coat, being softened, will not become fragmentary and blend into the flour, the gloss of the flour will never be deteriorated.

As might necessarily be concluded from the above statement, the present invention has the following merits; to separate the wheat grain into a less ashy flour and a more ashy bran, to improve the separating effect of the roll and finally to enhance the yield of milling.

As described above, the present invention consists in introducing the treatment of wheat with chloride dioxide or an aqueous solution of chloride dioxide in the supplemental water treatment stage of flour milling; and then grinding the wheat that has absorbed the water and chloride dioxide. The appropriate quantity, of supplemental water addition should be about 2-3% in terms of the weight of the tempered wheat; and that of chlorine dioxide should be 2-15 parts per million in terms of the weight of wheat. For example, 22 kg. of wheat will require about 0.2 g. of chlorine dioxide.

In the traditional method, about 1% of water is added to the tempered wheat and it is then kept at room temperature for about 15 minutes standing in the storage tank. In the method proposed by the present invention, water and chlorine dioxide or an aqueous solution of the latter are added to the tempered wheat in the stage of supplemental water addition; after that, about 1–2 minutes' soaking in the tank will suffice. Thus the present invention offers the possibility of carrying out a continuous operation with extreme smoothness.

If temperature-adjusting facilities to maintain the temperature of the water-added wheat at say 40° C. are also provided, and the water temperature is controlled to 40° C.–50° C., depending on the atmospheric temperature, it will be possible not only to secure a flour with far less ash content but also to elevate the operating efficiency to a higher level.

Moreover, under the traditional cold water tempering and hot conditioning the supply of water, heat and air to the wheat favors the multiplication of bacteria, causing as a result an objectionable odor and increased acidity. And to eliminate such troubles it becomes necessary to sterilize the rinsing water, the tempering water, and even the surface of wheat grain. By comparison, the present invention is entirely free from such troubles, because of the efficacy of the chlorine dioxide. Thus it can make a valuable contribution to sanitary control of flour by cutting down the number of bacteria in the flour.

The following is a detailed explanation of a preferred method of carrying out the present invention, with reference to the attached diagram:

Chlorine dioxide is generated in the generator 1, with its quantity and concentration (i.e., its dilution with air) regulated by a separate controller (not shown). The generated chlorine dioxide is distributed in arbitrary quantities over arbitrary channels by the gas distributor 2 and the control valve 3. The conveyer 4 has the charge hole 5, through which chlorine dioxide is admitted so as to be added to the bran, refuse of selection or a mixture of these or the ground materials. Temperature-adjusted water is admitted at the water supply hole 6 and enters through the control valve 8 into the water tank 7. The control valve 8 so adjusts the water supply that the inflow and the outflow are always equal; thus the water head in the tank is always kept constant. Chlorine dioxide is delivered through the gas supply hole 13 into the tank. The gas supply hole may be equipped with a spray nozzle which assists in transforming the chlorine dioxide into small bubbles which are dissolved to form an aqueous solution of chloride dioxide. The amount dissolved is equal to 92–98% of the charged gas. The aqueous solution of chlorine dioxide passes through the control valve 10 and the water gauge 9; and flows down through the inlet 12 of the conveyer 11. The wheat comes into the conveyer through the wheat supply hole 17 and after being mixed with the aqueous solution of chlorine dioxide, it falls through the wheat outlet 18 into the wheat tank 14.

The wheat is held within the wheat tank 14 for 1–2 minutes and after this period, is drained out of the tank at the wheat discharge hole 16. If the inner diameter of the wheat tank 14 is larger than that of the wheat discharge hole 16, the dropping speed of the wheat will differ from the center of tank to its periphery, resulting in an inequality of the holding time of wheat and accordingly a variance in the penetration of the aqueous solution of chlorine dioxide into the wheat grain. To remove this trouble, a uniform drop control 15 is adopted. The wheat discharge hole 16 is connected to the primary setting roll.

Application of the present invention in flour milling will produce, for instance, the following results:

| | Percent |
|---|---|
| Reduced ash content in flour | 0.02–0.03 |
| Increased ash content in bran | 0.50 |
| Improved yield of flour during milling proper | Over 80 |
| Improved yield of total during over-all milling process | 100 to 103 |
| Improved milling efficiency | 20–30 |

What is claimed is:

1. The method of conditioning tempered wheat to facilitate the separation of its skin from its endosperm which comprises the steps of adding water and chlorine dioxide to the tempered wheat, the weight of said water being about 2–3% of that of said tempered wheat and said chlorine dioxide amounting to from 2 to 15 parts per million in terms of the weight of said wheat, maintaining said wheat in contact with said water and chlorine dioxide for from 1 to 2 minutes, thereby causing said water to penetrate said skin until its water content is 10–15% greater than that of said endosperm, so as to permit the chlorine dioxide to penetrate, soften and toughen the skin, and milling said wheat while said skin remains in said softened and toughened condition.

2. The method of conditioning tempered wheat as claimed in claim 1 in which said wheat and water are maintained at a temperature between 40 and 50° C. while they are in contact.

3. The method of conditioning tempered wheat to facilitate the separation of its skin from its endosperm which comprises the steps of adding to said tempered wheat an aqueous solution of chlorine dioxide, the weight of the water content of said solution being about 2–3% of that of said tempered wheat and said chloring dioxide amounting to between 2 and 15 parts per million in terms of the weight of said wheat, maintaining said wheat in contact with said water and chlorine dioxide for from 1–2 minutes, thereby causing said water to penetrate said skin until its water content is 10–15% greater than that of said endosperm, so as to permit the chlorine dioxide to penetrate, soften and toughen the skin, and milling said wheat while said skin remains in said softened and toughened condition.

4. The method of conditioning tempered wheat as claimed in claim 3 in which said wheat and water are maintained at a temperature between 40 and 50° C. while they are in contact.

References Cited in the file of this patent

UNITED STATES PATENTS

| 1,987,304 | Menke | Jan. 8, 1935 |
| 2,379,335 | Baker | June 26, 1945 |